United States Patent [19]

Robson

[11] Patent Number: 5,543,967
[45] Date of Patent: Aug. 6, 1996

[54] BOOK SHADE APPARATUS

[76] Inventor: Nicholas B. Robson, P.O. Box 30297SMB, Grand Cayman Island, Cayman Islands

[21] Appl. No.: 292,401

[22] Filed: Nov. 14, 1994

[51] Int. Cl.⁶ .......................... G02B 27/00; G02B 23/16
[52] U.S. Cl. .................. 359/614; 359/601; 359/612
[58] Field of Search ...................... 359/227, 229, 359/350, 361, 436, 442, 601–615, 800–816; 281/2, 34–51; 248/444.1, 448, 451, 454, 918, 457; 160/105–110, 134; 402/79, 80 R, 80 L, 80 P; 156/251

[56] References Cited

U.S. PATENT DOCUMENTS

| | | | |
|---|---|---|---|
| 3,324,823 | 6/1967 | Peters | 281/42 |
| 3,712,712 | 1/1973 | Bosma | 359/442 |
| 3,790,420 | 2/1974 | Jenei | 156/251 |
| 3,809,352 | 5/1974 | Mathias | 248/444.1 |
| 4,681,251 | 7/1987 | Holladay | 248/444.1 |
| 4,875,708 | 10/1989 | Sremba et al. | 281/42 |

*Primary Examiner*—Thong Q. Nguyen
*Attorney, Agent, or Firm*—Michael I. Kroll

[57] ABSTRACT

A book shade apparatus comprising a structure placed over two open pages of a book in bright sunlight conditions, for reducing the amount of light reflected from the two open pages of the book into the eyes of a person reading the book including a pair of flexible sheets having sunlight reducing characteristics of sunglasses and sized to fit over the two open pages of the book.

3 Claims, 2 Drawing Sheets

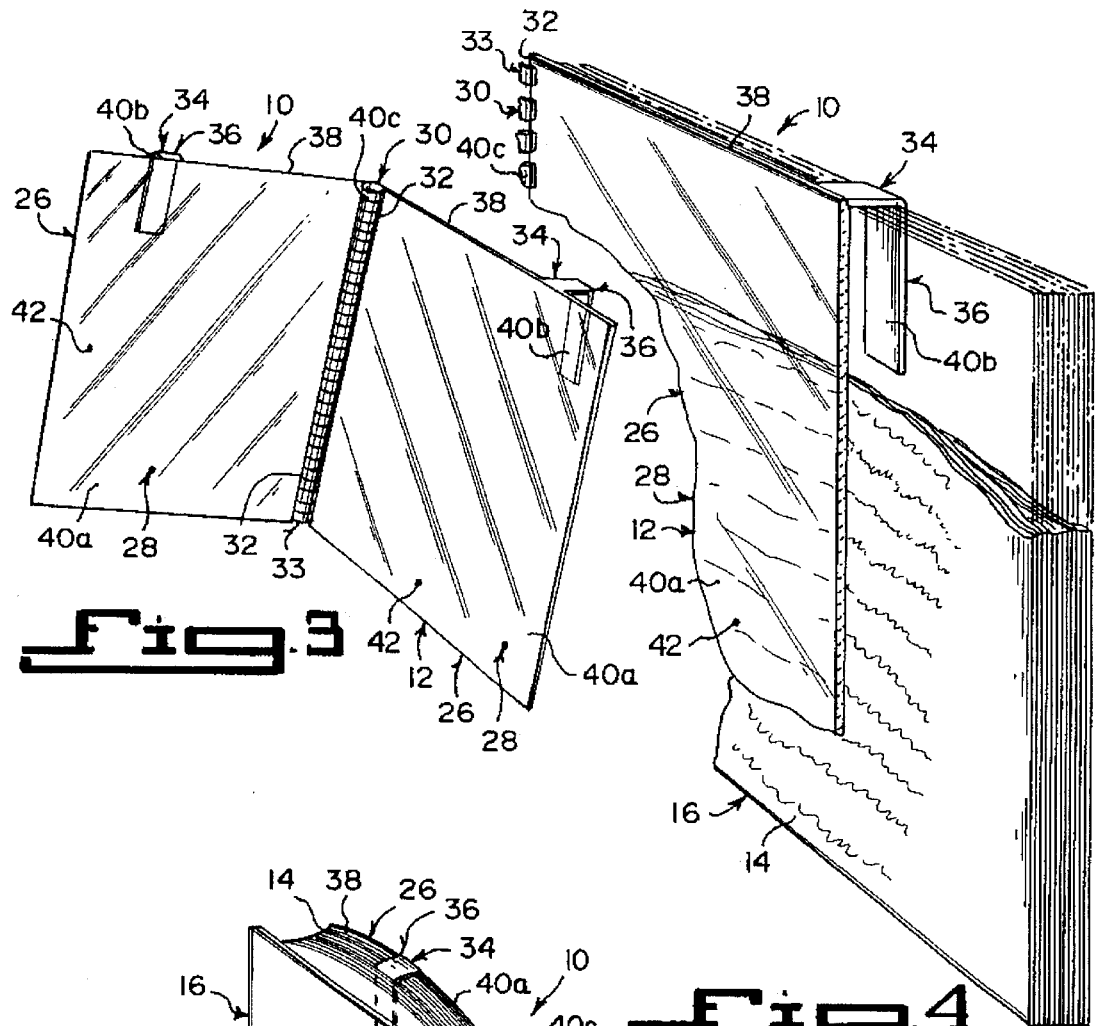
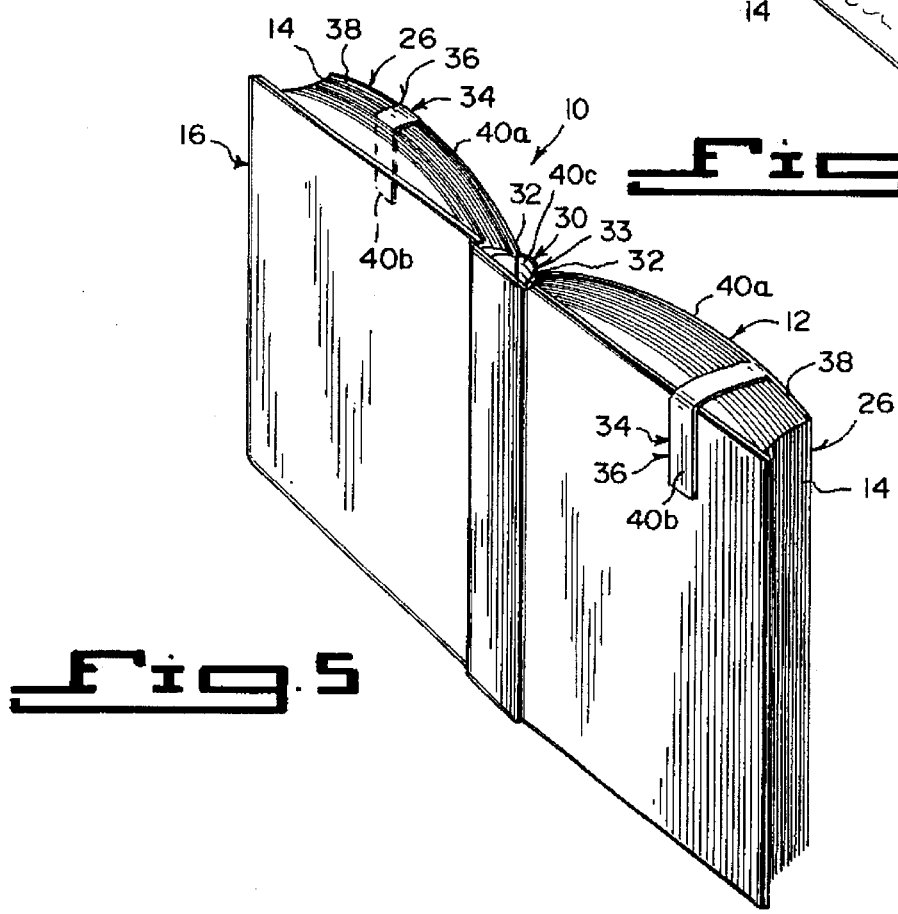

BOOK SHADE APPARATUS

BACKGROUND OF THE INVENTION

1. Field of the Invention

The instant invention relates generally to light filtering devices and more specifically it relates to a book shade apparatus.

2. Description of the Prior Art

Numerous light filtering devices have been provided in prior art that are adapted to protect the eyes of people from the harmful rays of the sun, such as sunglasses with tinted or polarizing lenses. While these units may be suitable for the particular purpose to which they address, they would not be as suitable for the purposes of the present invention as heretofore described.

SUMMARY OF THE INVENTION

A primary object of the present invention is to provide a book shade apparatus that will improve upon the prior art devices.

Another object is to provide a book shade apparatus that will enable a person to read a book comfortably in bright sunlight conditions, by cutting down the amount of light reflected from a page of the book into the eyes of the person.

An additional object is to provide a book shade apparatus that can be quickly connected and disconnected to any open page of the book, so that the person can read the book in safety. Since the harmful rays of bright sunlight will be reduced from the reflected light.

A further object is to provide a book shade apparatus that is simple and easy to use.

A still further object is to provide a book shade apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a perspective view of the instant invention per se;

FIG. 4 is an enlarged front perspective view of the instant invention in place on the book with parts broken away and in section; and FIG. 5 is a rear perspective view taken in the direction of arrow 5 in FIG. 2.

DETAILED DESCRIPTION OF THE PREFERRED EMBODIMENTS

Figure 1:
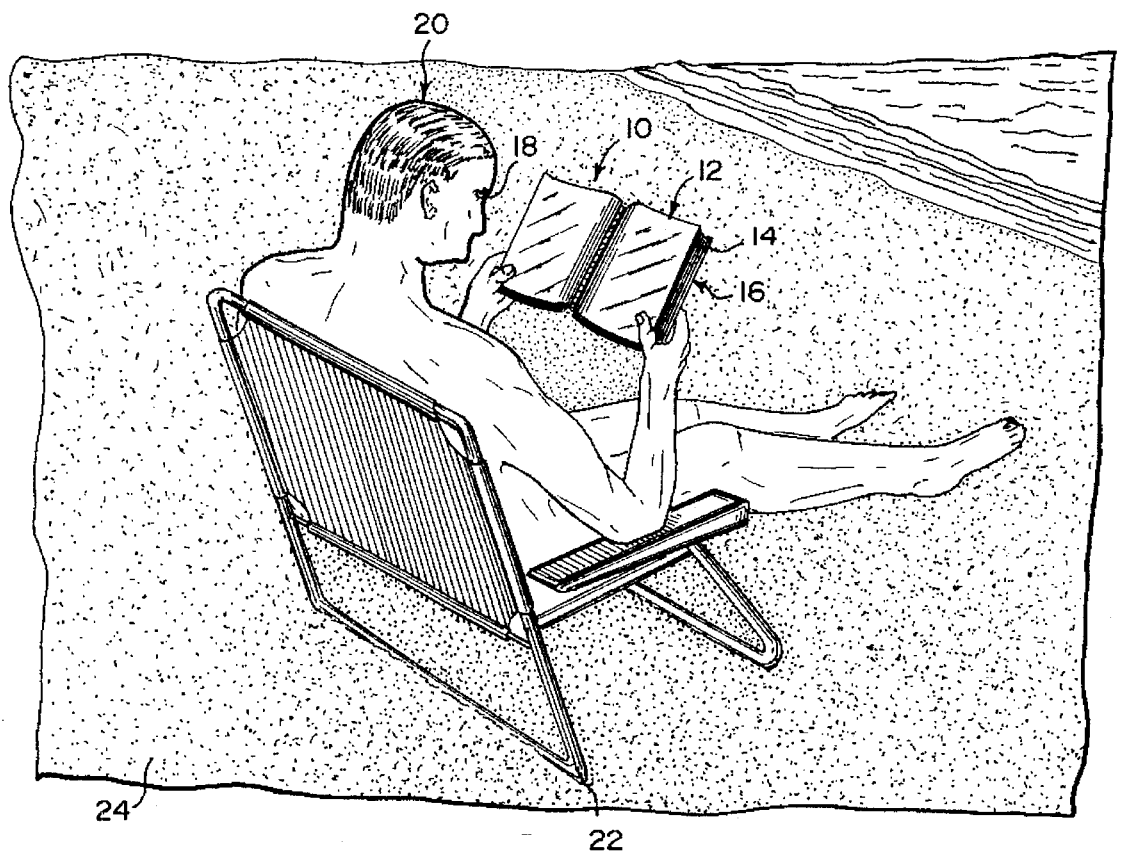
FIG. 1 is a perspective view of a person sitting in a beach chair and utilizing the instant invention in a book.
Figure 2:
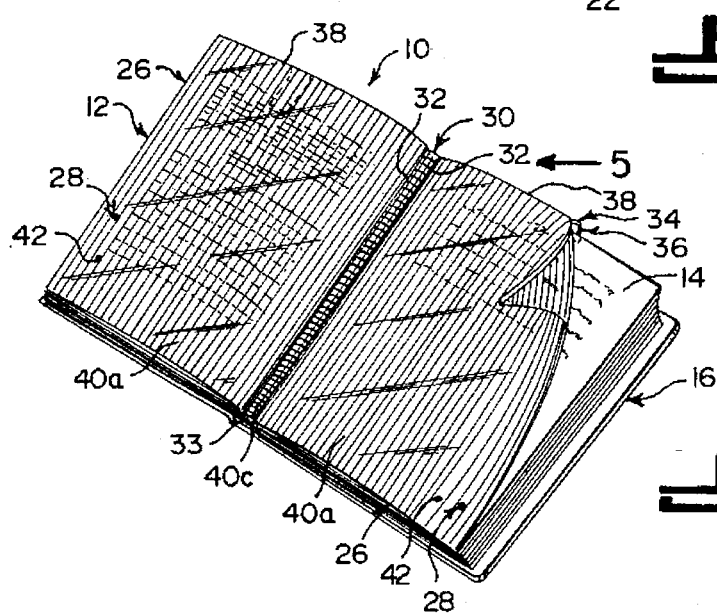
FIG. 2 is a front perspective view of the book showing the instant invention in place with one corner of the optical sheet turned back.

Turning now descriptively to the drawings, in which similar reference characters denote similar elements throughout the several views, FIGS. 1 through 5 illustrate a book shade apparatus 10 comprising a structure 12 placed over two open pages 14 of a book 16 in bright sunlight conditions. The structure 12 will reduce the amount of light reflected from the two open pages 14 of the book 16 into the eyes 18 of a person 20 reading the book 16, such as in a beach chair 22 on a beach 24 (see FIG. 1).

The light reducing structure 12 includes a pair of flexible sheets 26 having sunlight reducing characteristics of sunglasses 28 and sized to fit over the two open pages 14 of the book 16. A component 30 between abutting side edges 32 of the pair of flexible sheets 26, is for folding the sheets 26 over each other when not in use and out flat side by side when in use. The component 30 is a hinge 33 integrally formed between the abutting side edges 32 of the pair of flexible sheets 26.

The book shade apparatus 10 further contains items 34 for holding in a stationary manner, each flexible sheet 26 to each open page 14 of the book 16, so as to be in a proper position. The holding items 34 consists of a pair of tabs 36, each integrally formed on a top edge 38 of each flexible sheet 26, so as to hook over the pages 14 of the book 16.

Each flexible sheet 26 is made of a light, permanently transparent, weather-resistant thin piece of thermoplastic material 40a. Each tab 36 is made of the light permanently transparent, weather-resistant thin piece of thermoplastic material 40b. The hinge 33 is made of light permanently transparent, weather-resistant thin loops of thermoplastic material 40c.

The optical characteristic of sunglasses 28 for each flexible sheet 26 is a color tinting 42 impregnated into the thermoplastic material 40a, so as to reduce the harmful rays of bright sunlight reflected from each open page 14 of the book 16.

OPERATION OF THE INVENTION

To use the book shade apparatus, the following steps should be taken:

1. Open the book 16 to the two pages 14 that are to be read.
2. Open the two flexible sheets 26, so that they are in the flat side by side position.
3. Place the two flexible sheets 26 against the two open pages 14 of the book 16.
4. Hook the tabs 36 over the two open pages 14 of the book 16.
5. Read the printed matter on the two open pages 16 of the book 16.
6. To read additional pages 14 in the book 16, remove the book shade 10 from the book, and then repeat steps 1 through 5.

LIST OF REFERENCE NUMBERS 10 book shade apparatus
12 light reducing structure
14 open page
16 book
18 eye
20 person
22 beach chair
24 beach
26 flexible sheet
28 optical characteristic of sunglasses
30 folding component
32 side edge of 26
33 hinge for 30
34 holding items

36 tab
38 top edge of 26
40*a* piece of thermoplastic material for 26
40*b* piece of thermoplastic material for 36
40*c* loops of thermoplastic material for 33
42 color tinting in 40*a*

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A book shade apparatus comprising means placed on and in contact with two open pages of a book in bright sunlight conditions, for reducing sunlight to and reflected from said two open pages of the book into the eyes of a person reading the book, said light reducing means including a pair of transparent flexible sheets having optical characteristics to reduce the harmful rays of bright sunlight reflected from the open pages of the book and sized to completely cover said two open pages of the book, and further including means between abutting side edges of said pair of flexible sheets for folding said sheets over each other when not in use and out flat side by side when in use, said folding means being a hinge made of light permanently transparent, weather resistant thin loops of thermoplastic material integrally formed between the abutting side edges of said pair of flexible sheets and lined up along the center of said book between oppositely facing pages, and further including means for holding in a stationary manner, each said flexible sheet to each open page of the book, so as to be in a proper position, said holding means including a pair of tabs, each integrally formed on a top edge of each said flexible sheet, and being shaped sufficiently large to hook over the pages and cover of the book.

2. A book shade apparatus as recited in claim 1, wherein each said flexible sheet is made of a light, permanently transparent, weather-resistant thin piece of thermoplastic material.

3. A book shade apparatus as recited in claim 2, wherein each said tab is made of light permanently transparent, weather-resistant thin piece of thermoplastic material.

* * * * *